(No Model.)
G. NELSON.
MOLE TRAP.
No. 488,448. Patented Dec. 20, 1892.
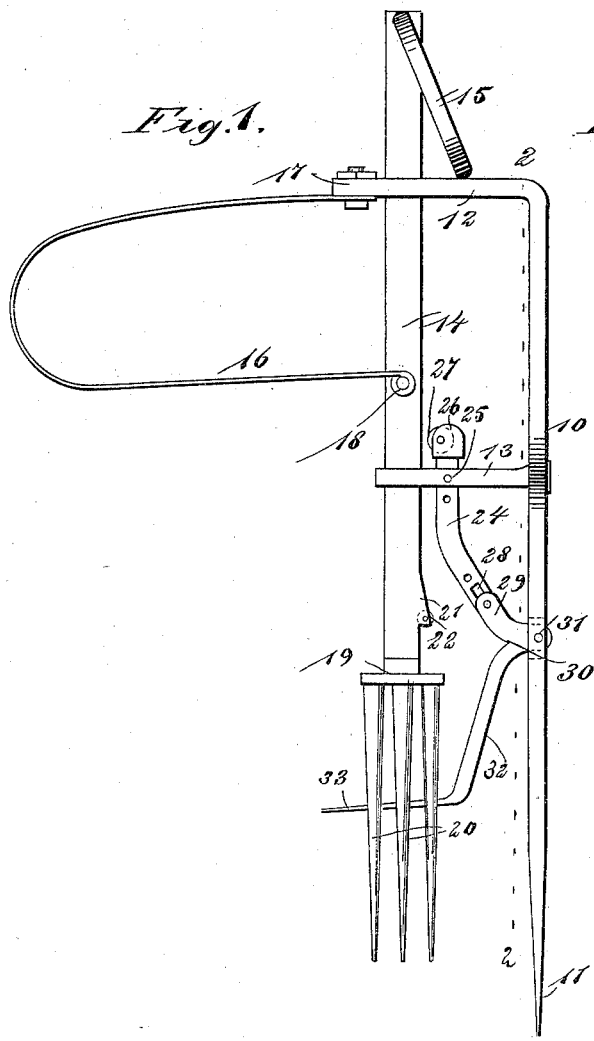
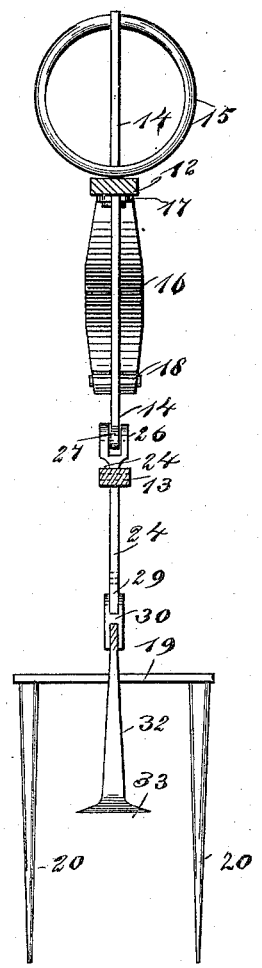
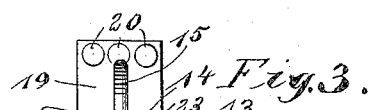
WITNESSES:
A. A. Erb.
Jo. Sedgwick
INVENTOR:
G. Nelson
BY Munn & Co
ATTORNEYS.

UNITED STATES PATENT OFFICE.

GEORGE NELSON, OF LIVINGSTON, TEXAS, ASSIGNOR OF ONE-HALF TO LILLIAN RAY FIFE, OF SAME PLACE.

MOLE-TRAP.

SPECIFICATION forming part of Letters Patent No. 488,448, dated December 20, 1892.

Application filed April 23, 1892. Serial No. 430,367. (No model.)

*To all whom it may concern:*

Be it known that I, GEORGE NELSON, of Livingston, in the county of Polk and State of Texas, have invented a new and Improved Mole-Trap, of which the following is a full, clear, and exact description.

My invention relates to improvements in animal traps, and especially such as are adapted for catching moles, although the trap may be used for catching other small animals.

The object of my invention is to produce a simple and cheaply made trap which may be easily set and as easily tripped, and which will operate positively so as to transfix any mole or other animal that trips it.

To this end my invention consists in a trap, the construction of which will be hereinafter described and claimed.

Reference is to be had to the accompanying drawings forming a part of this specification, in which similar figures of reference indicate corresponding parts in all the views.

Figure 1 is a side elevation of the trap embodying my invention; Fig. 2 is a vertical section of the same, on the line 2—2 in Fig. 1; and Fig. 3 is a plan view of the trap.

The frame of the trap consists of the vertical standard 10, which has a pointed lower end 11, to enable it to be driven into the ground, and a right angled bend 12 at the top, and the cross arm 13 which is secured to the standard near the center and extends forward beneath and parallel with the bent upper end 12. The bent end 12, and the cross arm 13, serve as supports and guides for the vertically movable plunger 14, which is held to slide in slots in the frame, and the plunger has at its upper end a ring 15, which serves as a handle and enables it to be easily raised against the pressure of the bow-spring 16, which spring has its upper end bolted, as shown at 17, to the forward part of the bent end 12 of the standard, and the lower end of the spring is secured to a stud 18 on the plunger 14. The pressure of the spring 16 will thus normally force the plunger 14 downward, and will also have a tendency to push backward slightly upon it. The lower end of the plunger terminates in a cross-head 19, at each end of which are parallel depending tines 20, which are sharpened at their lower ends so as to easily enter the ground and pierce a mole. Above the cross head 19, and on the back edge of the plunger 14, is a shoulder 21, in which is journaled a small roller 22, which assists in the easy setting and tripping of the plunger. The roller 22 is adapted to pass upward through a recess 25 in the arm 13, as shown in Fig. 3, and when the plunger 14 is raised until the shoulder 21 and roller 22 pass through the recess, the spring 16 will cause the plunger to swing backward so that the roller will rest upon the top of the arm 13, and thus hold the plunger in a raised position.

Immediately behind the plunger 14, and back of the recess 23, is a lever 24, which is pivoted in the arm 13, as shown at 25, and the lever has several pivot holes so that it may be adjusted and its throw may be regulated. The upper end of the lever 24 projects above the arm 13, and terminates in a head 26, in which is journaled a roller 27, the roller projecting forward so that it may be brought against the plunger 14. The lever 24, extends downward from the arm 13, and is bent rearward, the lower end of the lever being slotted longitudinally, as shown at 28, and this slot receives the pivot pin by which the lever is pivotally connected to the upwardly and forwardly-extending arm 29, of a bell crank lever 30, which is pivoted at its elbow in a recess of the standard 10, as shown at 31 in Fig. 1. The arm 29 and the lever 24, thus form a toggle joint, and the connection enables the plunger to be easily tripped as described below.

The lower arm 32 of the bell crank 30, extends downward and forward and terminates in a nearly horizontally extending trigger 33, which is broadened to give it the necessary surface, and which extends between the tines 20 at the opposite ends of the cross-head 19.

To set the trap the operator grasps the ring 15, and raises the plunger 14 until the shoulder 21 and roller 22 catch upon the upper surface of the arm 13. The standard 10 is then pushed downward into the ground at one side of a mole path, so that the trigger 33 will extend directly over the path and the tines 20 will be directly above the path. The standard is pushed into the ground far enough so that the trigger will press upon the earth raised by the mole and crowd it slightly downward. When the mole comes to the obstruction he pushes it up, thus lifting the trigger 33, and when the trigger is raised it raises the arm 32 of the bell crank 30, swings back the upper arm 29 of the bell crank, and thus pushes the upper end of the lever 24 forward, throwing the roller 27 against the plunger, and pushing the plunger 14 forward so that the roller 22 registers with the recess 23. The spring 16 then quickly throws the plunger downward, and the tines 20 pierce through the earth of the mole path and transfix the mole.

Having thus described my invention, I claim as new, and desire to secure by Letters Patent,—

1. A mole trap, comprising a vertical frame or standard, a vertically sliding spring pressed plunger mounted thereon and having the impaling devices on its lower end and a shoulder or offset between its ends, a transverse stationary arm on the frame or standard and upon which said shoulder or offset rests when the plunger is raised or retracted, a lever pivoted to the frame or standard with one end adjacent to and movable toward the shouldered or offset side of the plunger to push it laterally and disengage its shoulder or offset from said arm, and a trigger pivotally connected with said lever, substantially as set forth.

2. The combination, with the standard having forwardly-extending arms, of the spring-pressed plunger held to move in the arms, said plunger terminating at its lower end in a cross-head having depending tines, a roller journaled in a shoulder on the plunger and adapted to engage the lower arm of the standard, a swinging lever pivoted in the lower arm of the standard and having a roller at its free end to contact with the plunger, and a bell crank lever pivoted in the standard, the upper arm of the lever being pivoted to the tripping lever carrying the roller, and the lower arm being formed into a trigger which extends between the plunger tines, substantially as described.

3. A mole trap, comprising a vertical frame or standard, a vertically sliding spring pressed plunger mounted thereon and having the impaling devices on its lower end and a shoulder or offset between its ends, a transverse stationary arm on the frame or standard and upon which said shoulder or offset rests when the plunger is raised or retracted, a lever pivoted to the frame or standard with one end adjacent to and movable toward the shouldered or offset side of the plunger to push it laterally and disengage its shoulder or offset from said arm, a trigger pivotally connected with said lever, and a bow spring connected at its ends to the frame and plunger to throw the latter and also pressing it laterally and hold its offset or shoulder in engagement with said stationary arm, substantially as set forth.

GEORGE NELSON.

Witnesses:
OSCAR E. OATES,
A. B. GREEN.